RANDOM ACCESS POSITIONING MEANS FOR A MAGNETIC DISC FILE

Original Filed Aug. 23, 1965 3 Sheets-Sheet 1

INVENTORS
JOHN HANDLEY
JOHN C. SIMS, JR.
BY Francis J. Thomas
ATTORNEY

United States Patent Office 3,412,386
Patented Nov. 19, 1968

3,412,386

RANDOM ACCESS POSITIONING MEANS FOR A MAGNETIC DISC FILE

John Handley, Coulsdon, England, and John C. Sims, Jr., Sudbury, Mass.; said Sims assignor, by mesne assignments, to Mohawk Data Sciences Corporation, East Herkimer, N.Y., a corporation of New York Original application Aug. 23, 1965, Ser. No. 481,736. Divided and this application Jan. 28, 1966, Ser. No. 523,586

Claims priority, application Great Britain, Sept. 1, 1964, 35,710/64

13 Claims. (Cl. 340—174.1)

ABSTRACT OF THE DISCLOSURE

Data tracks on a magnetic disk are accessed by a read head which is adapted to be periodically realined with the data tracks by auxiliary positioning means which, while the normal positioning means remain stationarily referenced to a predetermined data track, drive the head until it is precisely centered on a reference track located a predetermined distance from the predetermined data track. After the reference track has been accessed, circuit means automatically drive the head back through the predetermined distance to put it over the data track, whereupon the auxiliary positioning means are disabled and the normal positioning means are reactivated.

This application is a divisional of a copending United States application No. 481,736, filed Aug. 23, 1965, by John Handley, which application describes an improvement in or modification of a copending United States application No. 398,631, filed Sept. 23, 1964 by John Handley, now U.S. Pat. No. 3,260,450, or certain aspects thereof. Said application Ser. No. 398,631 relates to mechanical movements particularly but not exclusively for use in information disc files, and to parts thereof which may or may not have wider application.

This invention concerns such a mechanical movement or part.

The operation of disc files involves the movement of the processing heads radially across the discs to select any desired one of a large number of closely spaced coaxially circular recording track positions. It is necessary to locate the processing heads precisely with relation to the extremely narrow tracks: this is particularly necessary with magnetically-recorded tracks since the strength of the signal recorded falls off to both sides of a center track position of maximum amplitude, and it is desirable, in order to obtain the greatest strength of readout signal, to locate the read head precisely on the selected track.

The electro-mechanical setting controls described in the aforesaid application Ser. No. 398,631 gives a very close approximation to precision location with relation to the tracks, but the interacting variables which can affect such setting make it desirable to provide some vernier adjustment within a selected track.

In the aforesaid application, a manual vernier adjustment between the positioning equipment for the read head arms and the arms themselves was provided.

The object of the present invention is to provide more sophisticated vernier adjustment which eliminates the manual element.

According to the invention, automatic intercontrol arrangements are provided between a track scanning device for processing the read head across a track, and readout signal examining equipment.

Figures 1, 2:
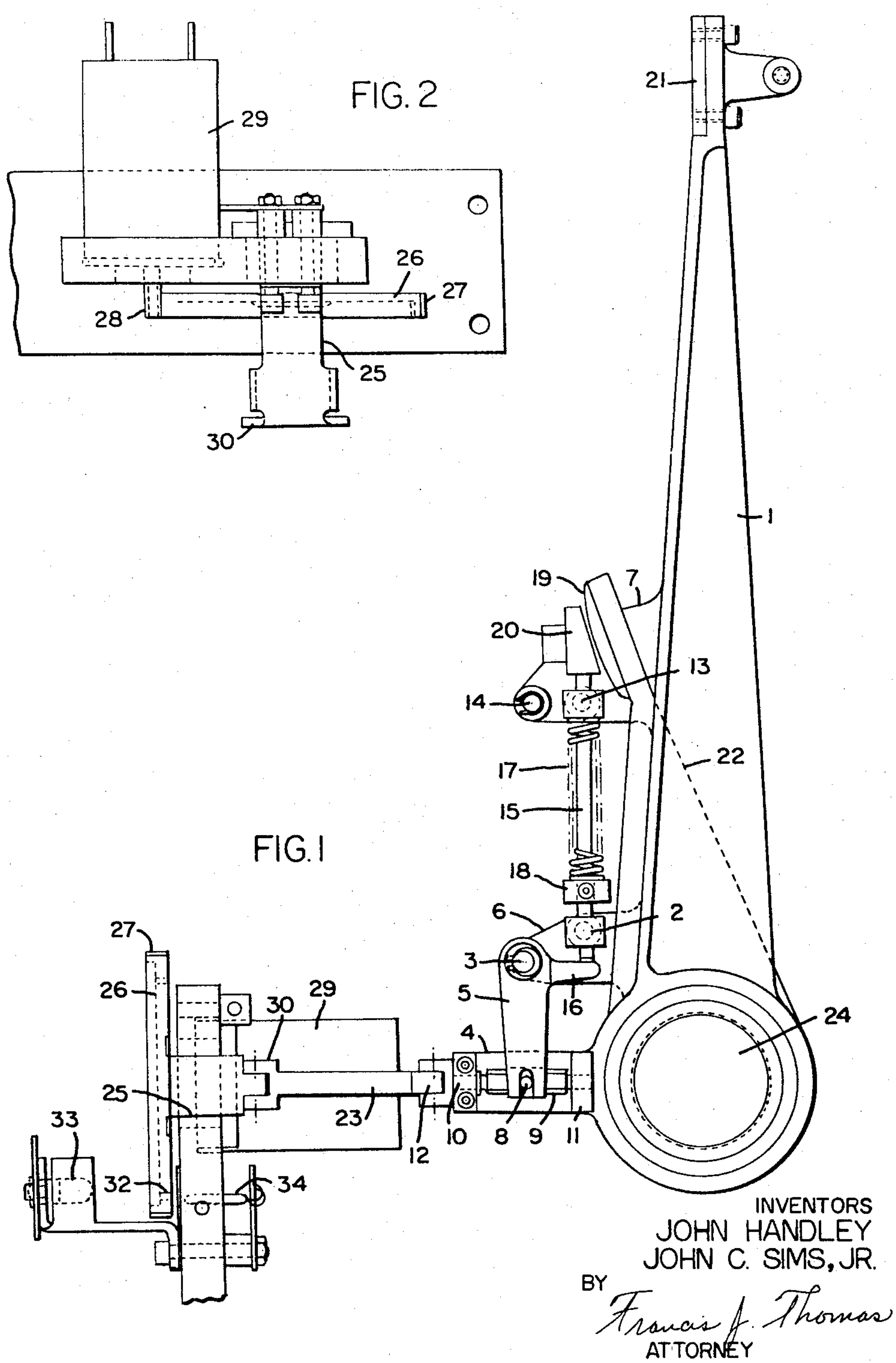
Figure 3:
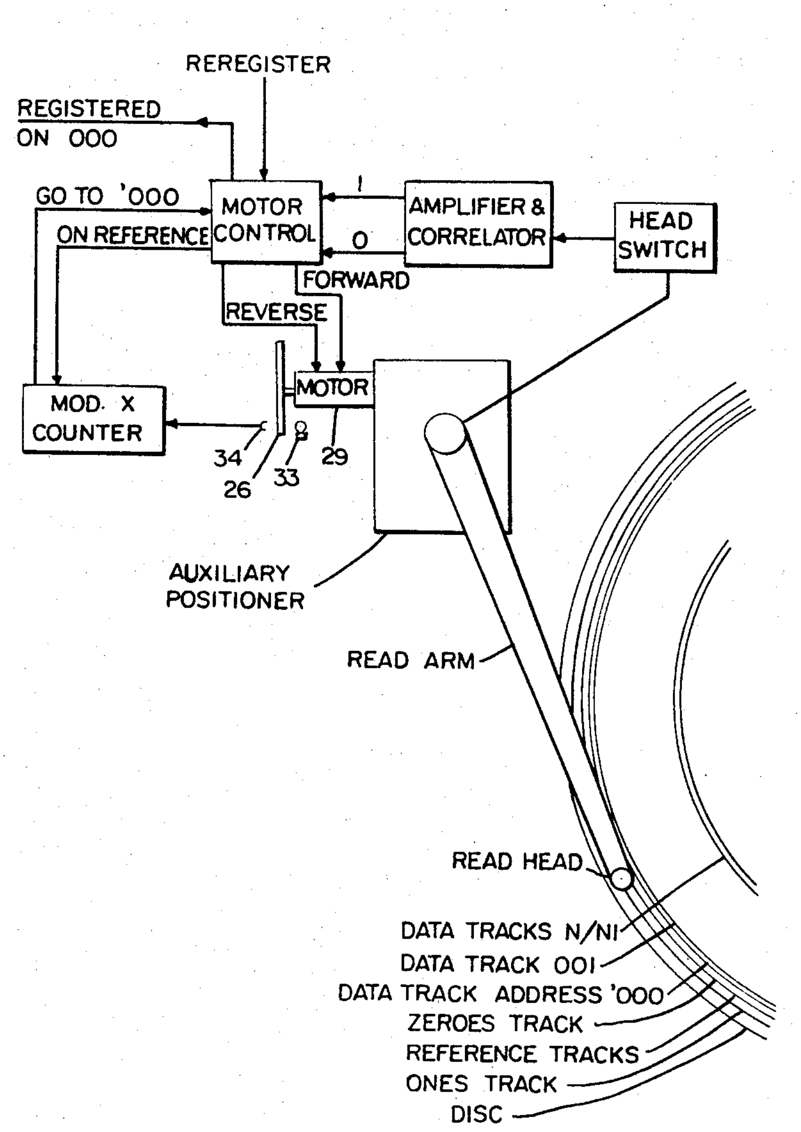
Figure 4:
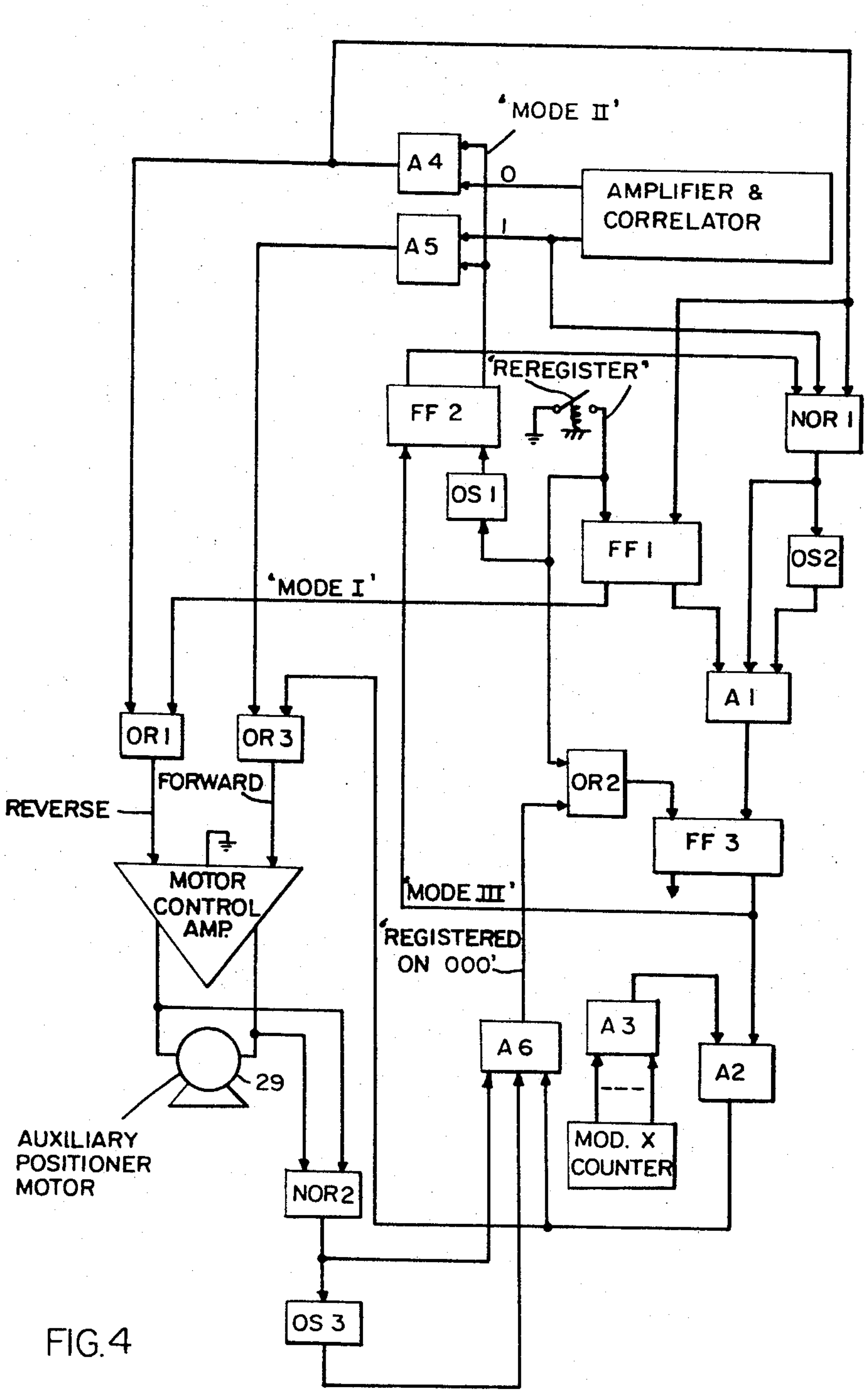

The invention will be described with reference to an embodiment shown in the accompanying drawing in which:

FIGS. 1 and 2 show a read arm shaft adjustment device linked to driving mechanism provided with a movement signalling device, while, FIGS. 3 and 4 show the closed-circuit system and electronic control circuits respectively.

The drive shaft 24 for the read arm assembly carries a rotatable arm 1 connected at 21 to the track selector mechanism which in normal data accessing operations rotates shaft 24 through arms 1 and 22, which work as a single unit. The hub of arm 1 carries a radial bracket 4 on which are mounted bearings 10, 11 for a corrector spindle 9 on the outer end of which is a coupling spider 12. Spindle 9 is in screw engagement with a corrector gimbal 8 in driving engagement with the forked end of a two-armed lever 5 pivoted at 3 on one of two brackets 6, 7 on the arm 1. The brackets 6, 7 carry bearings 2, 13 for an axially movable corrector spindle 15 which is urged downwards by a helical spring 17 between a block 18 fixed to the spindle and bearing 13. The lower end of spindle 15 is located by the arm 16 of lever 5, while the upper end of the spindle 15 carries an adjusting wedge 20, the flat face of which is in contact with a slightly curved positioning block 19 on an arm 22 fixed to the read-arm shaft 24.

Rotation of corrector spindle 9 moves gimbal 8 along the shaft and rotates lever 5 in one direction or the other according to the direction of rotation of spindle 9.

The spider 12 on spindle 9 is lined by a connecting shaft 23 to a coupling spider 30 on a shaft 25 which carries a corrector rotor comprising a disc 26 carrying a cylindrical gear 27. Gear 27 is in mesh with a small gear 28 on the shaft of an electric servomotor 29. The gears 28, 27 give a 20.1 reduction ratio for example, so that gear 27 and shafts 25, 23, 9 are rotated very slowly by motor 29, which is reversible.

The stroke of spindle 15 and wedge 20 is sufficient to move the read arms away from the outer track position towards test tracks recorded beyond the outer data track. By driving the motor in what will be called the Reverse direction, the shaft 9, FIG. 1, is rotated so as to oscillate the lever 5, 16 clockwise thus allowing the spindle 15 to move downwards together with wedge 20 which is followed by arms 22, 1 to rotate the read arms radially outwards. By means to be described the read arms are set to a precise and predetermined test position in relation to the test tracks.

To set the read arms from the test position into operative relation with the discs, it is necessary to move them from the test position by a predetermined distance on to the outer data track. This is done by driving the motor 29, FIG. 1, in the forward direction, so that the wedge 20 is moved upwards and forces the read arms to move inwardly. The distance is measured in the following manner.

The disc 26 of the main gear wheel has a circular series of equally-spaced holes 32 near its periphery. On opposite sides of the disc 26 are mounted a lamp 33 and a photo-cell 34 for detecting the passage of the holes in the disc 26 between the lamp and the photo-cell.

The photo-cell output is connected to an electronic counter shown in FIGS. 3 and 4, which receives a pulse from the photo-cell for each hole 32 passing between lamp 33 and photo-cell 34 and counts a predetermined number of pulses determined by the distance between the test position and the outer record track.

When the counter has received the predetermined number of pulses, it stops the motor leaving the read arms correctly set on the outer data track.

FIG. 3 shows in schematic form the closed loop servo reregister system by means of which the movement of the read arms outwards to the test position and back to accurate relation with the outer data track is controlled.

Each disc provides as previously stated a large number e.g. 264, of concentric circular data tracks the outer one of which is numbered 000. On a control disc outside the track 000 and spaced therefrom are recorded two test tracks the inner one of which records all "0's" while the outer one records all "1's." These tracks are so positioned that there is left between them an extremely narrow blank test track bounded on each side by readable "0" and "1" track boundaries, so that only when the read head of the control disc is precisely located on the blank test track will it give no readable output. Data tracks N, N–1 are a randomly-chosen pair of tracks to indicate the succession of tracks terminating with the inner data track 263.

The drive equipment shown in FIG. 1 for moving the read arms for reregistration purposes is shown diagrammatically by the box labelled Auxiliary Positioner, the motor 29 and the photo-electric equipment 33, 26, 34 being separately shown, together with a pulse counter for counting the pulses from photo-cell 34, a motor control circuit, an amplifier and correlator circuit, and a head switch by means of which the read head output is transmitted to the amplifier and correlator, wherein incoming 0's and 1's are directed via separate channels to the motor control.

When it is desired to reregister the read heads on the tracks, the heads are first of all set on to the outer data track 000 by the normal setting means controlled by multielement binary code signals. These means rotate shaft 24 by operating on arm 1 at the end 21 thereof. Thereafter, for the duration of the reregistration operation arm 1 remains stationary.

A reregister key is now operated as a result of which a signal is applied to the motor control to operate the motor 29 in reverse. At present, the lamp 33 is not illuminated and no pulses are sent to the counter. Shaft 24 is rotated clockwise and the read arms will be moved slowly outwards until the control read head reads 0's from the inner test track as a result of which the head switch modifies the controls. Continued operation of the motor is now dependent on the receipt of read head signals of one sort or the other, the arrangement being that the receipt of 0's results in continued reverse running of the motor, while receipt of 1's results in forward running of the motor.

Thus if the initial outward movement of the read heads overruns the zeros test track on the ones test track, the motor will change its direction of rotation and drive the read arms inwards. Similarly, an overrun in the inward direction will result in a change in motor operation to drive the read arms outwards.

A stable servo condition is reached when neither 1's nor 0's are being received, the control read head being located on the blank reference track between the zeros test track and the ones test track.

When this stable condition persists for a predetermined time, the controls are again changed to give forward operation of the motor and inward movement of the read heads under control of the counter, and to light the lamp 33 so that the forward rotation of the disc 26 from the reference track position results in pulses from photo-cell 34 to the counter. Alternatively, the lamp 33 can be alight throughout reregistration, and the counter is inoperative until it receives a signal from motor control when the stable servo condition is reached, as indicated in FIG. 3.

When the requisite number of pulses has been counted, the motor is stopped; for example, by termination of a "Go to track 000′ signal from the counter." The read heads are now in correct relation to the outer data track, and a signal "Registered on 000" is sent to give a suitable indication that reregistration is complete. The normal head positioning equipment can now be used for setting the read heads to any desired data track.

Referring to FIG. 4, once the selected head has been positioned by the normal positioning apparatus to the location of track 000 according to the current setting of the heads, operation to register the heads accurately on the tracks is begun by momentarily pressing the reregister switch. This action sets a conventional flip-flop FF1 to a state "Mode I" in which a signal is applied through an OR gate OR1 to cause the motor control amplifier to operate the motor 29 to move the heads outwards towards the zeros test track. At the same time, a conventional one-shot multivibrator OS1 is triggered. After a time selected to be ample to ensure that the selected head is clear of data track 000, and approaching zero test track the multivibrator OS1 sets a flip-flop FF2 to a state "Mode II" in which AND gates A4 and A5 are enabled to pass zeros and ones respectively, from the amplifier and correlator to OR gates OR1 and OR3, respectively. It will be remembered that the amplifier and correlator is connected to receive signals from the control read head and to direct 0's and 1's into respective outgoing channels. In the "Mode II" state, the flip-flop FF2 also removes an input from a NOR gate NOR1 to permit it to operate at a later time. When the selected head reaches the zeros reference track, the amplifier and correlator will produce a train of zeros. This output train of zeros acts through the gate OR1 to continue the motor in reverse, rests the flip-flop FF1, and holds NOR1 inoperative.

The initial "reregister" signal also sets a flip-flop FF3 to a reference state through an OR gate OR2. As the auxiliary positioner moves the selected head past the zeros test track, it will either stop in the blank reference location between the zeros track and the ones track, or overshoot and encounter the ones track. If it does the latter, the "ones" output from the amplifier will be applied via AND gate A5 to an OR gate OR3 to cause the motor control amplifier to drive the motor 29 toward the zeros track.

Eventually, the heads will remain stationary with the motor 29 stopped and the heads located on the blank reference track between the zero and one test tracks, with the amplifier producing no output signals. Up to this time, gate NOR1 has been disabled by either "0" or "1" pulses from the amplifier, but now the gate NOR1 is enabled to apply a pulse to a conventional one-shot multivibrator OS2 having a suitable time delay to ensure that the positioner system has come to rest. At the end of this period, the one-shot multivibrator OS2 will produce a pulse, which in combination with the signals from the gate NOR1 and from the flip-flop FF1 (indicating that it has been reset) opens a conventional AND gate A1, and sets the flip-flop FF3 to a second state "Mode III," in which it resets the flip-flop FF2 and operates an AND gate A2, which is normally primed by an AND gate A3, controlled by the counter. Gate A2 now causes the motor control amplifier to run the motor forward, through a gate OR3, and the counter is effective to count positions backward to data track 000. When the counter reaches this condition, it will produce outputs enabling AND gate A3 to disable gate A2, stopping the motor. When the motor control amplifier has been stopped for a sufficient time, a signal "REGISTERED ON 000" will be produced to reset the flip-flop FF3 through the gate OR2.

This signal is provided by a conventional NOR gate NOR2 and a third one-shot multivibrator OS3 which together, in cooperation with the absence of output from the gate A2, enable an AND gate A6 to produce the required signal to reset the flip-flop FF3. The output of the gate A6 may also be used to provide an indication that the file is now ready for operation with the heads in position and flying in registry with the data tracks.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for positioning a record-accessing device comprising, in combination:
  a unitary record containing data indicia and position-test indicia at predetermined relative locations on the record;
  a positionable record-accessing device including an indicia sensing portion;
  controllable means for positioning the record-accessing device to move said indicia sensing portion throug ing device to move said indicia sensing portion through an accessing range that includes the locations of the data indicia and the test indicia;
  and means responsive to the position of the test indicia for controlling the positioning means to position the record-accessing device to the precise location of the data indicia.

2. An apparatus for positioning a record-accessing device comprising, in combination:
  a record containing data indicia and position-test indicia at predetermined relative locations on the record;
  a positionable record-accessing device including an indicia sensing portion device;
  and means responsive to the sensing of test indicia by said sensing portion for positioning the record-accessing device to the location of the test indicia, and for subsequently positioning the record-accessing device to place said sensing portion in a predetermined location with respect to the location of the test indicia for accessing data.

3. An apparatus for positioning a record-accessing device comprising, in combination:
  a unitary record containing data indicia at predetermined address locations and position-test indicia at a predetermined relative location with respect to the data indicia;
  a positionable record-accessing device including an indicia sensing portion;
  controllable means for positioning the record-accessing device to move said indicia sensing portion through an accessing range that includes the location of the data indicia and the test indicia;
  and means initially responsive to the sensing of the test indicia by said sensing portion and thereafter responsive to a selected address for controlling the positioning means to access selected data indicia.

4. An apparatus for positioning a record-accessing device comprising, in combination:
  a record containing data indicia at predetermined address locations and position-test indicia at a predetermined relative location with respect to the data indicia;
  a positionable record-accessing device including an indicia sensing portion;
  and means responsive to the sensing of test indicia by said sensing portion for positioning the record-accessing device to the location of the test indicia, and subsequently responsive to a selected address for positioning the record-accessing device to place said sensing portion in position to access selected data indicia.

5. An apparatus for positioning a record-accessing device comprising, in combination:
  a unitary rotatable record containing a plurality of addressable data tracks and containing at least one positioning track;
  a positionable record-accessing device including a record sensing portion;
  positioning means for controlling the position of the record-accessing device;
  control means operative to cause said positioning means to move said record-accessing device to locate said sensing portion over said positioning track, said control means including circuit means for generating an output signal when said track has been accessed; and
  means responsive to said output signal and to a predetermined address to cause said positioning means to move said accessing device to locate said sensing portion over a selected data track determined by said address.

6. The apparatus described in claim 5, wherein the record is a disk.

7. The apparatus descirbed in calim 6, wherein data is magnetically accessed.

8. An apparatus for positioning the record sensing portion of a record-accessing head with respect to tracks of a storage medium comprising, in combination:
  a storage medium containing data tracks and at least one test track, all tracks being at predetermined relative positions;
  positioning means responsive to movement commands for positioning said head; and
  means for supplying a first movement command to the positioning means until said sensing portion is over said test track, and then for supplying a second movement command of fixed duration to the positioning means, which fixed duration corresponds to the predetermined distance between the test track and a predetermined data track.
  whereby the sensing portion of said record-accessing head is exactly positioned on the predetermined data track independently of the exact location of the data track on the storage medium.

9. The apparatus described in claim 8, wherein the record is a disk.

10. The apparatus described in claim 9, wherein data is magnetically accessed.

11. The method of positioning the record sensing portion of a record-accessing head with respect to data tracks of a storage medium where each data track has an address which is uniquely dependent upon its exact distance from a reference track and which is independent of its exact position on the medium, comprisng the steps of:
  moving the head toward the reference track until the reference track is accessed by said sensing portion;
  and then moving the head a predetermined distance which is determined by an address to cause the addressed data track to be accessed by said sensing portion.

12. The method of controlling a positioning system to locate the record sensing portion of a record-accessing head on a selected data track of a storage medium, where the positioning system is controlled both by a selection address and a correction command where each data track has a unique selection address, and where an additional track containing positioning data is located on the medium at a position which is dependent upon the position of the data tracks and independent of its exact position on the medium, comprising the steps of:
  applying a predetermined selection address to the positioning system;
  applying a first correction command to the positioning system until the positioning data track is accessed by said sensing portions of said head;
  applying a second correction command of fixed duration to the positioning system, the duration of said command being solely dependent upon the distance between the positioning data track and the data track having the predetermined selection address;

and then applying the selection address of the data track to the positioning system to locate said portion over said selected data track.

13. The method of claim 12 wherein the predetermined selection address corresponds to a data track that is adjacent to the positioning test track.

References Cited

UNITED STATES PATENTS

| | | | |
|---|---|---|---|
| 3,185,972 | 5/1965 | Sippel | 340—174.1 |
| 3,156,906 | 11/1964 | Cummins | 340—174.1 |
| 3,126,535 | 3/1964 | Streeter | 340—174.1 |
| 3,105,963 | 10/1963 | Stevens et al. | 340—174.1 |

BERNARD KONICK, *Primary Examiner.*

A. I. NEUSTADT, *Assistant Examiner.*